United States Patent [19]

Darcie et al.

[11] Patent Number: 4,730,888
[45] Date of Patent: Mar. 15, 1988

[54] OPTIMIZED GUIDED WAVE COMMUNICATION SYSTEM

[75] Inventors: Thomas E. Darcie, Hazlet; Matthew S. Whalen, Rumson, both of N.J.

[73] Assignee: American Telephone and Telegraph Company, AT&T Bell Laboratories, Murray Hill, N.J.

[21] Appl. No.: 831,461

[22] Filed: Feb. 20, 1986

[51] Int. Cl.$^4$ .............................. G02B 6/28; H04B 9/00
[52] U.S. Cl. ................................... 350/96.16; 455/612
[58] Field of Search ................... 350/96.15, 96.16; 333/109, 111; 455/610, 612

[56] References Cited

U.S. PATENT DOCUMENTS

| | | | |
|---|---|---|---|
| 4,006,963 | 2/1977 | Baues et al. | 350/96 |
| 4,146,297 | 3/1979 | Alferness et al. | 350/96.14 |
| 4,166,669 | 9/1979 | Leonberger et al. | 350/96.14 |
| 4,181,399 | 1/1980 | McMahon et al. | 350/96.14 |
| 4,317,614 | 3/1982 | Palmer | 350/96.16 |
| 4,336,047 | 6/1982 | Pavopoulos et al. | 65/3.31 |
| 4,390,236 | 6/1983 | Alferness | 350/96.14 |
| 4,550,974 | 11/1985 | Murphy | 350/96.15 |

FOREIGN PATENT DOCUMENTS

0114903  9/1981  Japan ................. 350/96.15

OTHER PUBLICATIONS

Optics Communications, Jul. 1977, vol. 22, No. 1, "Modification of the Coupling Coefficient by Periodic Modulation of the Propagation Constants." by Tsukada, Mitsubishi Corp.
Gedeon, Jrnl. Opt. Soc. of America, vol. 64, No. 5, May 1974, pp. 615-618.
Alferness et al., Topical Meeting Integrated & Guided Wave Optics, Jan. 16-18, 1978, Salt Lake City, Utah, pp. TuA3-1-TuA3-3.
Bergh et al., Electronic Letters, vol. 16, No. 7, Mar. 27, 1980, pp. 260-261.
Digonnet et al., IEEE Jrnl. Quantum Electronics, vol. QE-18, No. 4, Apr. 1982, pp. 746-754.

*Primary Examiner*—Eugene R. LaRoche
*Assistant Examiner*—James C. Lee
*Attorney, Agent, or Firm*—Erwin W. Pfeifle

[57] ABSTRACT

The present invention relates to an optimized guided wave microwave or lightwave communication system or network wherein a plurality of directional couplers (14, 17) (a) are disposed along a bus-like wave guiding means (13, 16), and (b) include separate coupling coefficients which are optimized. More particularly, the present invention relates to a guided wave communication system or network including, for example, a head-end unit (15) which is coupled to one end of a bus-like wave guiding means. Separate directional couplers are disposed along the wave guiding means to couple lightwave or microwave signals either (a) into the bus-like wave guiding means (13) from separate transmitters (11), or (b) from a bus-like wave guiding means (16) to separate receivers (12). The directional couplers disposed along a guiding means each include a separate coupling coefficient which is optimized to only couple enough of the lightwave or microwave energy onto or from the associated guiding means so that either (a) the head-end unit receives a minimal signal power level from each transmitter or (b) the receivers receive a minimal signal power level from the head-end unit, respectively, to provide a predetermined bit error rate regardless of their distance from the head-end unit along the associated wave guiding means.

9 Claims, 3 Drawing Figures

TABLE: RESULTS FOR $n_{max}$ IN EQUATION (3)

| $K$ \ $P_3(db)/P_1$ | OPTIMIZED | | | | NON OPTIMIZED | | |
|---|---|---|---|---|---|---|---|
| | -20 | -30 | -40 | | -20 | -30 | -40 |
| .1 | 30 | 80 | 125 | | 5 | 18 | 43 |
| .2 | 21 | 48 | 77 | | 5 | 15 | 33 |
| .3 | 17 | 35 | 54 | | 4 | 13 | 27 |
| .4 | 14 | 28 | 42 | | 4 | 12 | 23 |

OPTIMIZED GUIDED WAVE COMMUNICATION SYSTEM

TECHNICAL FIELD

The present invention relates to an optimized guided wave communication system and, more particularly, to a guided wave communication system wherein the coupling coefficients of directional couplers disposed along a lightwave or electromagnetic guiding means are optimized to maximize the permissible number of nodes of the system.

DESCRIPTION OF THE PRIOR ART

Guided wave communication systems can be defined as communication systems wherein a signal to be transmitted is guided along a lightwave or electromagnetic guiding means. With such systems, the use of lightwave communication in both local and long distance communication systems is increasing at a rapid rate, although each of the system types has its advantages and disadvantages in certain areas of communication. Typical local communication systems are Local Area Networks (LANs) which can comprise various lightwave configurations to handle resource-sharing data and/or speech communications. Such LANs include the bus, ring, star and tree configurations, or possible combinations of such configurations, which generally illustrate most of the lightwave configurations found in non-repeatered communication systems. In this regard see, for example, the articles "A Local Area Network Architecture Overview" by C. D. Tsao in *IEEE Communications Magazine*, Vol. 22, No. 8, August 1984 at pages 7-11; and "Optical Fibers in Local Area Networks" by M. R. Finley, Jr. in *IEEE Communications Magazine*, Vol. 22, No. 8, August 1984, at pages 22-35. Typical repeatered lighwave systems might take the form of, for example, a bus-type LAN with repeaters disposed along the bus to amplify the signal, or a bus or a tree-type LAN where a Head End unit retransmits a signal received from a bus in a first direction back onto the same or different bus for propagation in a second direction. Within such LANs, the users are coupled to the bus-like lightwave guiding means of the system via lightwave directional couplers to enable one user of the system to transmit lightwave information signals to, and receive lightwave information signals from, another user of the system via the interconnecting bus-like lightwave guiding means.

A major limitation to the permissible number of users on a bus-like lightwave or electromagnetic system, such as a local area network (LAN), is imposed by the tapped power and excess loss of each lightwave or electromagnetic directional coupler. For this reason the "Star" topologies, which require a complicated star coupler and use excessive quantities of lightwave guiding means, or regenerative "active" networks may appear relatively attractive. The problem remaining in the prior art is to provide a guided wave communication system which permits more nodes or users than normally permitted in prior art guided wave communication systems while providing the advantage of the simplification of receiver designs by permitting the use therein of a narrow dynamic range of operation.

SUMMARY OF THE INVENTION

The foregoing problem in the prior art has been solved in accordance with the present invention which relates to an optimized guided wave communication system or network and, more particularly, to a guided wave communication system or network wherein the coupling coefficients of directional couplers disposed along a bus-like lightwave or electromagnetic guiding means are optimized to maximize the permissible number of nodes or users of the system.

It is an aspect of the present invention to provide a guided wave communication system or network which includes a head-end unit which receives guided wave transmissions from each of the system nodes or users via a bus-like guided wave path and/or transmits guided wave signals to the system nodes or users along a bus-like waveguide path. In such system, each user is coupled to the wave-guided path via a separate directional coupler which includes a separate coupling coefficient from that of the other directional couplers. The coupling coefficient at each of the directional couplers disposed along the wave guiding means is increased relative to the number of couplers between a coupler and the head-end unit such that (a) the head-end unit would receive substantially the same minimal power level from each user, and/or (b) each user would receive substantially the same minimal power level signal from the head-end unit to achieve a predetermined permissible bit error rate.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

In accordance with the present invention, a bus-like guided wave communication system, or network, is disclosed which enables the optimization of coupling coefficients for included directional couplers to provide a considerable increase in the permissible number of system or network nodes or users than found in prior guided wave communication systems or networks. The description hereinafter of the present invention will be directed to the optimization of the known "D" type lightwave network, but it is to be understood that such description is for purposes of exposition only and not for purposes of limitation to such "D" type networks. Rather, the principles of the present invention described hereinafter can also be applied to other types of lighwave or microwave communication systems or networks which include more than one waveguide directional coupler along a bus-like wave guiding means.

Figure 1:
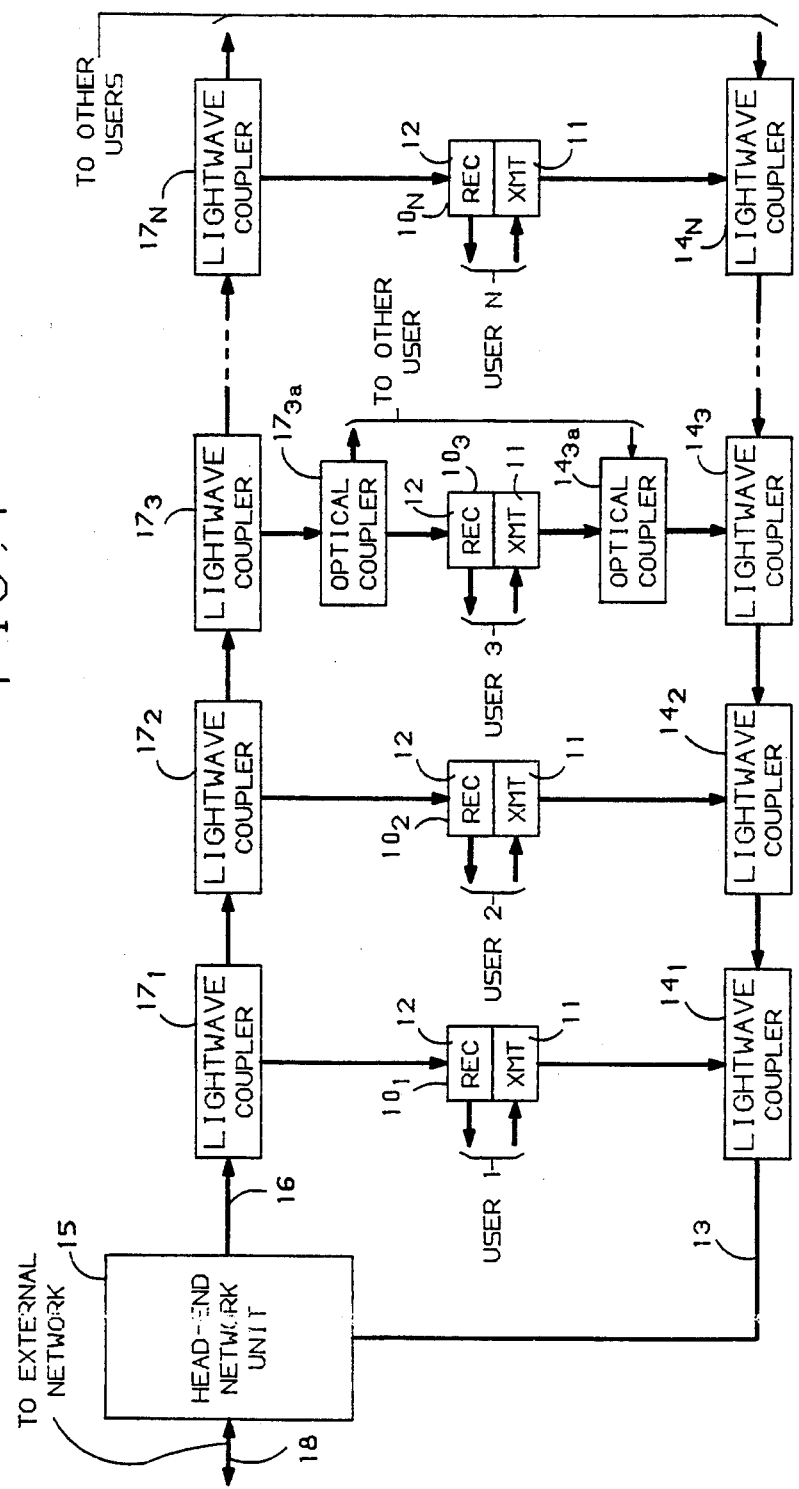
FIG. 1 is a typical arrangement of an exemplary "D" type lightwave network which includes directional couplers which are optimized with separate predetermined coupling coefficients.

FIG. 1 is a block diagram of an exemplary "D" type communicatin network, in which the present invention can be used, which permits each of a plurality of N users of the network to communicate with one another or with other persons or devices reachable via a communications network external to the present network. In the arrangement of FIG. 1, each of users 1—N has associated therewith a separate one of transceivers $10_1$ to $10_N$, respectively, with each transceiver $10_i$ comprising a transmitter 11 and a receiver 12. In the present arrangement, transmitters 11 of transceivers $10_1$ to $10_N$ have their outputs connected to lightwave guiding means 13, such as an optical fiber, via lightwave directional couplers $14_1$ to $14_N$, respectively. For guided wave microwave systems or networks, it is to be understood that the guiding means 13 and 16 would generally comprise a rectangular or circular waveguide and directional couplers 14 and 17 would comprise corresponding waveguide-type directional couplers. Each of the lightwave directional couplers $14_i$, shown in the lightwave arrangement of FIG. 1, is arranged to couple lightwave information signals, transmitted by the associated transmitter 11, into lightwave guiding means 13 for propagation towards a head-end network unit 15. In accordance with the present invention, each of lightwave directional couplers $14_1$ to $14_N$ includes a separate coupling coefficient which depends on the number of couplers 14 between a coupler and head-end unit 15. The reason for this will be explained in greater detail hereinafter.

Head-end unit 15 functions to retransmit the signal from each of transmitters 11 received on lightwave guiding means 13 in the separate channels or time slot periods to either (a) a lightwave guiding means 16, for any local calls within the network, or (b) to the external communications network, via guiding means 18, after performing any necessary processing. The output signal from head-end unit 15, propagating on lightwave guiding means 16, is directed towards receivers 12 of transceivers $10_1$ to $10_N$ by lightwave directional couplers $17_1$ to $17_N$, respectively. In accordance with the present invention, each of directional couplers $17_1$ to $17_N$, like couplers $14_1$ to $14_N$, includes a separate coupling coefficient which depends on the number of couplers 17 between that coupler and head-end unit 15. The reason for this will be explained in greater detail hereinafter.

Receivers 12, in transceivers $10_1$ to $10_N$, function to receive the coupled out signals from lightwave guiding means 16 and to detect and appropriately process only the information destined for the associated user before transmitting such information to the associated user. It is to be understood that the linear arrangement of lightwave guiding means 13 and 16 shown in FIG. 1 is only provided for simplicity of explanation of the present lightwave communication network. It is to be further understood that in actuality lightwave guiding means 13 and 16 most probably would include, for example, lightwave combiners or dividers, respectively, to provide optional lightwave paths in a tree-type distribution system. In such arrangement, each lightwave path would include one or more directional lightwave couplers 14 and 17 as shown, for example, in FIG. 1 for user 1, 2 and N, where one lightwave coupler is used to couple to each lightwave guiding means 13 or 16; or for user 3 where lightwave directional couplers $14_3$ and $17_3$ provide the lightwave combining and dividing functions, respectively, between respective lightwave guiding means 13 and 16 and the tree sub-branch, while lightwave directional couplers $14_{3a}$ and $17_{3a}$ provide the sub-branch coupling to user 3.

In the operation of the exemplary D-type network of FIG. 1, each transceiver 10 transmits lightwave signals to head-end unit 15 via transmitter 11, lightwave directional coupler 14 and lightwave guiding means 13, and listens to signals from head-end unit 15 via lightwave guiding means 16, lightwave directional coupler 17 and receiver 12. If, for example, user 1 wishes to communicate with user N, then user 1, via transmitter 11 of transceiver $10_1$, first transmits the lightwave signal information via lightwave coupler $14_1$, and lightwave guiding means 13 to head-end unit 15 which then retransmits the information to user N via lightwave guiding means 16, lightwave coupler $17_N$, and receiver 12 of transceiver $10_N$. The transmission of lightwave signals between users of the system on lightwave guiding means 13 and 16 can comprise any suitable technique such as, for example, a time division multiple access (TDMA) technique where each user obtains, or is assigned, a free time slot at the initiation of a call using any well-known technique, and then continues using that assigned time slot until the two-way communication is terminated. A typical TDMA technique which may be used, and is known for obtaining a free time slot for a two-way communication in the system of FIG. 1, would be, for example for transmitter 11 associated with a user desiring to make a call to transmit control information, including the calling and called party addresses, in a special lightwave signaling channel or time slot via associated lightwave coupler 14 and lightwave guiding means 13 to head-end unit 15. Head-end unit 15 would receive such call initiation control information and, for example, assign a free time slot for each party, and return such information to both the calling and called party via lightwave guiding means 16, the associated lightwave couplers 17, and receivers 12 of associated transceivers 10. Transceivers 10, associated with the calling and called parties, would then transmit packets of information or data including (a) a preamble including the addresses of both parties, and (b) an information section including the message to be sent in the associated transmitter's assigned time slot period; and receive the associated two-way call information from the other party in the associated receiver by detecting the address corresponding to that receiver in the preamble of a received packet.

Figures 2, 3:
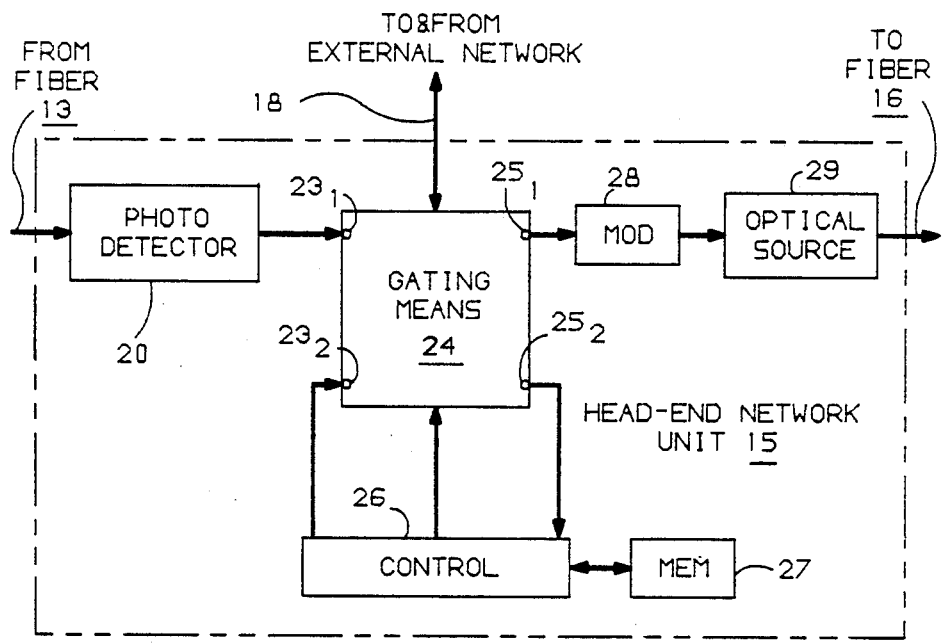
FIG. 2 is an exemplary arrangement of a head-end unit for use in the system of FIG. 1.
FIG. 3 is a Table illustrating the results for $n_{max}$ in Equation (3) for the optimized and non-optimized networks.

An exemplary arrangement for head-end unit 15 for practicing the above-mentioned technique is shown in FIG. 2. There, the signals propagating on lightwave guiding means 13 are received by a photo-detector 20 which functions to convert the lightwave signals from lightwave guiding means 13 into corresponding electrical signals. The output from photodetector 20 is terminated at a separate input $23_1$ of a gating (or switching) means 24.

Gating means 24 functions to appropriately connect, during each time slot period of a TDMA frame period, either (a) the output from photodetector 20 at terminal $23_1$ to either one of (1) the external network via guiding means 18, (2) output terminal $25_1$ for transmission to fiber 16, or (3) output terminal $25_2$ for transmission to controller 26; (b) an output control signal from controller 26 on input terminal $23_2$ to either one of the external network via guiding means 18 or output terminal $25_1$ for transmission on fiber 16; or (c) the signal received from the external network via guiding means 18 to either one of output terminal $25_1$ or $25_2$ for delivery to fiber 16 or controller 26, respectively. Controller 26 is shown as including a memory 27 which stores the programs and scratch pad information for, for example, (a) keeping track of the status of each of the time slot periods (idle, busy) and the origination, and possibly the destination, address used for such time slot period, (b) keeping track of the interconnection sequence to be made through gating means 24 during each TDMA frame sequence, (c) closing paths through the gating means in accordance with the appropriate interconnection sequence to be made during each time slot period of a TDMA frame period, and (d) processing control signals for initiation or termination of a call and assigning free time slots or idling used time slot, respectively, and communicating such assignment or termination to the appropriate users. Such functions are well known in the art and generally can be accomplished through table look-up procedures. Controller 26 can comprise a microprocessor or any other computing means to achieve the above functions.

In a typical call initiation, the calling party transmits origination and destination addresses via lightwave guiding means 13 to head-end unit 15 where controller 26 would sequence through memory 27 to determine if the destination address is busy or not, and if not busy then to find idle time slots for use on the two-way call. If the called party is found busy, or no idle time slots are found, then a busy tone would be sent back to the calling party, as is well known in the art. If (a) the destination address is idle and (b) free time slots are found, then controller 26 transmits appropriate control signals to the calling and called party and closes the appropriate path during each of the assigned time slot periods. It is to be understood that origination and destination address information to initiate a call, or termination information to end a call, can be transmitted (a) during a separate assigned time slot of the TDMA frame period, or (b) on a separate common lightwave signaling channel, to head-end unit 15 from transceivers $10_1$ to $10_N$ via lightwave guiding means 13 or from the external network via guiding means 18.

Turning now to the novelty of the present invention and its ability to increase the number of users or nodes possible in the network of FIG. 1 over that found in a similar prior art system or network, the following supposition will be made to explain the present invention. If (a) the lightwave power coupled into the receive lightwave guiding means 16 by head-end unit 15 has a magnitude of $P_1$, (b) each receiver 12 requires $P_3$ power for detection of the received lightwave signal to achieve a predetermined bit error rate (BER), and (c) the excess loss (including the splice loss) in each lightwave directional coupler 17 is K, then the lightwave coupling coefficients associated with the lightwave directional couplers 17 along receive lightwave guiding means 16 must be:

$$C_1 = \frac{P_3}{P_1} \quad (1)$$

$$C_n = \frac{C_1}{(1-K)^{n-1}\left(1 + \frac{C_1}{K}\right) - \frac{C_1}{K}} \quad (2)$$

The maximum number of nodes in then:

$$n_{max} = \left\{ \ln \left[ \frac{C_1\left(1 + \frac{1}{K}\right)}{1 + \frac{C_1}{K}} \right] \right\} / \ln(1-K) \quad (3)$$

Similarly, if (a) each user transmitter 11 injects a magnitude of lightwave power equal to $P_1$ into a short connecting lightwave guiding means, and (b) some fraction of the power $P_1$ is coupled onto transmit lightwave guiding means 13 by the associated lightwave coupler 14 such that a magnitude of lightwave power equal to $P_3$ reaches head-end unit 15 from each user, then the same value of $n_{max}$ shown in Equation (3) applies to the transmit bus 13. Equation (3) results in the Table shown in FIG. 3 for the values of $n_{max}$. From the Table of FIG. 3, it can be seen that for a 30dB transmission margin and a 0.2 dB excess loss, the optimization in accordance with the present invention increases the number of users from 15 to 48; a significant improvement. Another advantage of the present invention is that it permits the simplification of the design of receivers 12 since only a narrow dynamic range need be used.

Therefore, in accordance with the present invention, each of lightwave directional couplers $14_1$ to $14_N$, and $17_1$ to $17_N$ in the system or network of FIG. 1 includes a separate lightwave coupling coefficient which is dependent on the number of couplers from head-end unit 15 on lightwave guiding means 13 or 16. More particularly, the coupling coefficient of each lightwave directional coupler 14 or 17 along lightwave guiding means 13 and 16, respectively, is increased in accordance with the number of that coupler from head-end unit. For fiber 16, for example, the coupling coefficient for each lightwave coupler 17 is increased as a coupler has more couplers disposed between it and head-end unit 15 along lightwave guiding means 16 to permit a greater percentage of the lightwave power remaining on the lightwave guiding means, after all the losses experienced from the prior couplers, to be coupled out to the associated user and insure substantially a minimal necessary power level is received by all receivers 12. What is to be understood is that the magnitude of the power coupled out by each coupler 17 to each associated receiver 12 is only that magnitude of power which is necessary to provide detection of the received signal at the associated receiver with an acceptable minimal predetermined BER. This can be seen from the fact that the first coupler $17_1$ receives all of the power $P_1$ from head-end unit 15 and requires a lesser percentage to be coupled out to meet the $P_3$ power requirement for detection than, for example, coupler $17_N$ which only receives the power $P_1$ less all of the losses incurred with the prior couplers $17_1$ to $17_{N-1}$.

In prior systems, all couplers had the same coupling coefficients which required that the head-end unit transmit sufficient power so that the last user on the lightwave guiding means could receive sufficient power for the signal to be detected with the predetermined BER. With such prior art system condition, the directional couplers on the receive lightwave guiding means anywhere before the last coupler coupled out much more power than was required for the associated receivers 12 to detect their signal and achieve a minimal predetermined BER. Therefore, in accordance with the present invention, by adjusting each coupler 17 to only couple out a sufficient amount of power to allow a receiver to detect its signal with a predetermined BER, more power remains for continued coupling-out at subsequent couplers 17 to permit a significant increase in the number of nodes possible in a system or network. It is to be understood that the same philosophy applies for transmissions on transmit lightwave guiding means 13. More particularly, by decreasing the coupling coefficient of each directional coupler 14 as one nears the head-end unit, the same amount of power from each transmitter is received at head-end unit 15.

Each of lightwave couplers 14 and 17 can comprise any suitable arrangement which comprises the desired coupling coefficient as shown, for example, in U.S. Pat. Nos. 4,336,047 issued to T. G. Panopoulas et al. June 22, 1982, and No. 4,550,974 issued to K. A. Murphy on Nov. 5, 1985, which relate to fused biconical taper optical couplers which can be made to selectively include a predetermined coupling coefficient. An alternative arrangement for optical couplers 14 and 17 are tunable optical couplers as disclosed, for example, in the article "Analysis Of A Tunable Single Mode Optical Fiber Coupler" by M. J. F. Digonnet et al., in *IEEE Journal of Quantum Electronics*, Vol. QE-18, No. 4, April 1982, at pages 746–754. Corresponding couplers can be obtained for electromagnetic waveguides such as a conventional waveguide probe including a gain adjusting device (e.g., resistance) for providing the appropriate coupling coefficient.

Configurations for transmitters 11 and receivers 12 are known in the art and can comprise any of the well-known configurations which are normally used dependent on the transmission technique used, such as TDMA, FDMA, etc. and the signaling technique used. More particularly, although the present invention has been described hereinbefore only by using TDMA techniques for purposes of exposition and simplicity, FDMA techniques can also be used wherein the separate channel signals include bandwidths which may be the same or different. Under conditions where the channel bandwidths are different, the coupling coefficients of the directional couplers can be individually adjusted to consider the channel bandwidth and its effect on providing a minimal amount of signal power to the head-end unit 15 or to the associated receiver 12 to achieve a predetermined BER. For example, the coupling coefficient of a directional coupler is normally increased as the bandwidth of the channel to be received or transmitted is increased in order to provide a signal power at the receiving unit which achieves a predetermined BER. It is to be further understood that the present invention can be applied to a system comprising either one or both of guiding means 13 and 16, such as in a broadcast system where only guiding means 16 and receivers 12 are used.

What is claimed is:

1. A guided wave communication system or network associated with a plurality of users, the system or network comprising:
    a guiding means (16) including a first end for propagating signal waves introduced into the first end thereof; and
    a plurality of directional couplers (17) disposed in a spaced apart relationship along the guiding means, each coupler (a) being separately associated with at least one user of the system or network, and (b) being arranged with a separate coupling coefficient for coupling out from the signal power arriving at the coupler in the guiding means only a minimal signal power level which is necessary to provide a signal with a predetermined bit error rate to the at least one user.

2. A guided wave communication system or network according to claim 1 wherein
    the guiding means is an optical guiding means for propagating lightwave signals therein; and
    the directional couplers are optical couplers.

3. A guided wave communication system or network according to claim 1 wherein the system or network further comprises:
    a second guiding means (13) including a first end and a second end for propagating signal waves towards the second end thereof from each of the plurality of users; and
    a plurality of second directional couplers (14) disposed in a spaced apart relationship along the second guiding means, each second coupler (a) being separately associated with at least one user of the system or network and (b) being arranged with a separate coupling coefficient for coupling a selected predetermined signal power level of a signal transmitted by the at least one associated user into the second guiding means such that the signal power from each of the plurality of users of the system or network is only of a minimal power level to provide a predetermined bit error rate at the second end of the second guiding means.

4. A guided wave communication system or network according to claim 3 wherein
    the second guiding means is an optical guiding means for propagating lightwave signals therein; and
    the directional couplers are optical couplers.

5. A guided wave communication system or network according to claim 1 wherein
    the guiding means is a waveguide for guiding electromagnetic waves; and
    the directional couplers are waveguide directional couplers with each coupler comprising a separate coupling coefficient.

6. A guided wave communication system or network according to claim 3 wherein
    the second guiding means is a waveguide for guiding electromagnetic waves; and
    the second directional couplers are waveguide directional couplers with each second coupler comprising a separate coupling coefficient.

7. A guided wave communication system or network associated with a plurality of users, the system or network comprising:
    a guiding means (13) including a first end for propagating signal waves from the plurality of users to the first end thereof; and
    a plurality of directional couplers (14) disposed in a spaced apart relationship along the guiding means, each coupler (a) being separately associated with at least one of the plurality of users, and (b) being arranged with a separate coupling coefficient for coupling a separate selected portion of the power of a signal transmitted by the associated at least one user into the guiding means such that a predetermined signal power level is delivered to the first end of the guiding means which is only of a minimal power level to provide a predetermined bit error rate from each of the plurality of users regardless of the number of couplers disposed between a user's associated coupler and the first end of the guiding means.

8. A guided wave communication system or network according to claim 7 wherein
    the guiding means is an optical guiding means for propagating lightwave signals; and
    the directional couplers are optical couplers.

9. A guided wave communicaton system or network according to claim 7 wherein
    the guiding means is a waveguide for guiding electromagnetic waves; and
    the directional couplers are waveguide directional couplers with each coupler being arranged with separate coupling coefficient.

* * * * *